United States Patent
Marco et al.

(10) Patent No.: US 8,037,162 B2
(45) Date of Patent: Oct. 11, 2011

(54) METHOD AND SYSTEM FOR ACCELERATING RECEIPT OF DATA IN A CLIENT TO CLIENT NETWORK

(75) Inventors: Talmon Marco, Herzliya (IL); Assaf Natanzon, Ramat Aviv (IL); Hayim Shaul, Bat-Yam (IL); Ilan Rachmani, Rishon Le-Zion (IL); Nathaniel Leibowitz, Tel-Aviv (IL); Yossi Richter, Tel-Aviv (IL)

(73) Assignee: PeeApp Ltd., Newton Upper Falls, MA (US)

( * ) Notice: Subject to any disclaimer, the term of this patent is extended or adjusted under 35 U.S.C. 154(b) by 935 days.

(21) Appl. No.: 11/784,330

(22) Filed: Apr. 6, 2007

(65) Prior Publication Data

US 2007/0198726 A1 Aug. 23, 2007

Related U.S. Application Data

(63) Continuation of application No. 09/810,410, filed on Mar. 19, 2001, now Pat. No. 7,203,741.

(60) Provisional application No. 60/239,273, filed on Oct. 12, 2000.

(51) Int. Cl.
*G06F 15/173* (2006.01)

(52) U.S. Cl. ...................................... 709/223

(58) Field of Classification Search .................. 709/223; 713/201
See application file for complete search history.

(56) References Cited

U.S. PATENT DOCUMENTS

| | | | |
|---|---|---|---|
| 5,950,198 A * | 9/1999 | Falls et al. ............................. | 1/1 |
| 6,003,045 A * | 12/1999 | Freitas et al. .......................... | 1/1 |
| 6,018,780 A * | 1/2000 | Fenchel ........................ | 710/105 |
| 6,085,251 A * | 7/2000 | Fabozzi, II .................... | 709/230 |
| 6,105,029 A * | 8/2000 | Maddalozzo et al. ................ | 1/1 |
| 6,167,446 A * | 12/2000 | Lister et al. ..................... | 709/223 |
| 6,240,461 B1 * | 5/2001 | Cieslak et al. ................ | 709/235 |
| 6,339,785 B1 * | 1/2002 | Feigenbaum ................. | 709/213 |
| 6,460,087 B1 * | 10/2002 | Saito et al. ..................... | 709/236 |
| 6,976,165 B1 * | 12/2005 | Carpentier et al. ........... | 713/165 |
| 7,043,644 B2 * | 5/2006 | DeBruine ...................... | 713/153 |
| 7,203,741 B2 * | 4/2007 | Marco et al. .................. | 709/223 |
| 2002/0010866 A1 * | 1/2002 | McCullough et al. ......... | 713/201 |
| 2002/0049760 A1 * | 4/2002 | Scott et al. ...................... | 707/10 |

* cited by examiner

Primary Examiner — Jerry Dennison

(74) Attorney, Agent, or Firm — Rajesh Vallabh; Foley Hoag LLP

(57) ABSTRACT

A method and system for accelerating receipt of data in a client to client network. The method includes the steps of intercepting queries and responses, storing the intercepted queries and responses in an acceleration server and transmitting the intercepted responses to clients submitting intercepted queries. The system includes at least one acceleration server designed and configured to perform the steps included in the method.

101 Claims, 2 Drawing Sheets

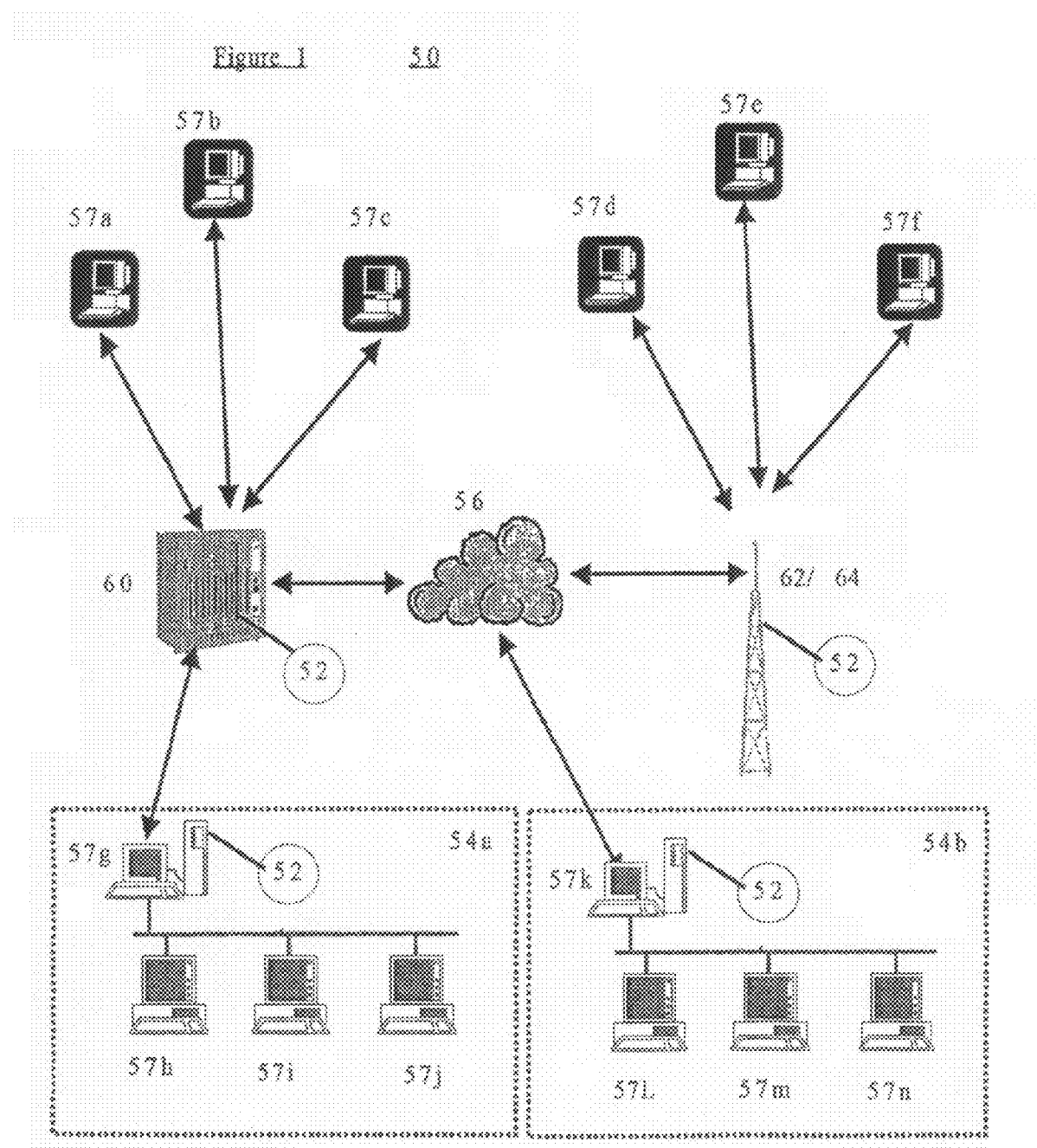

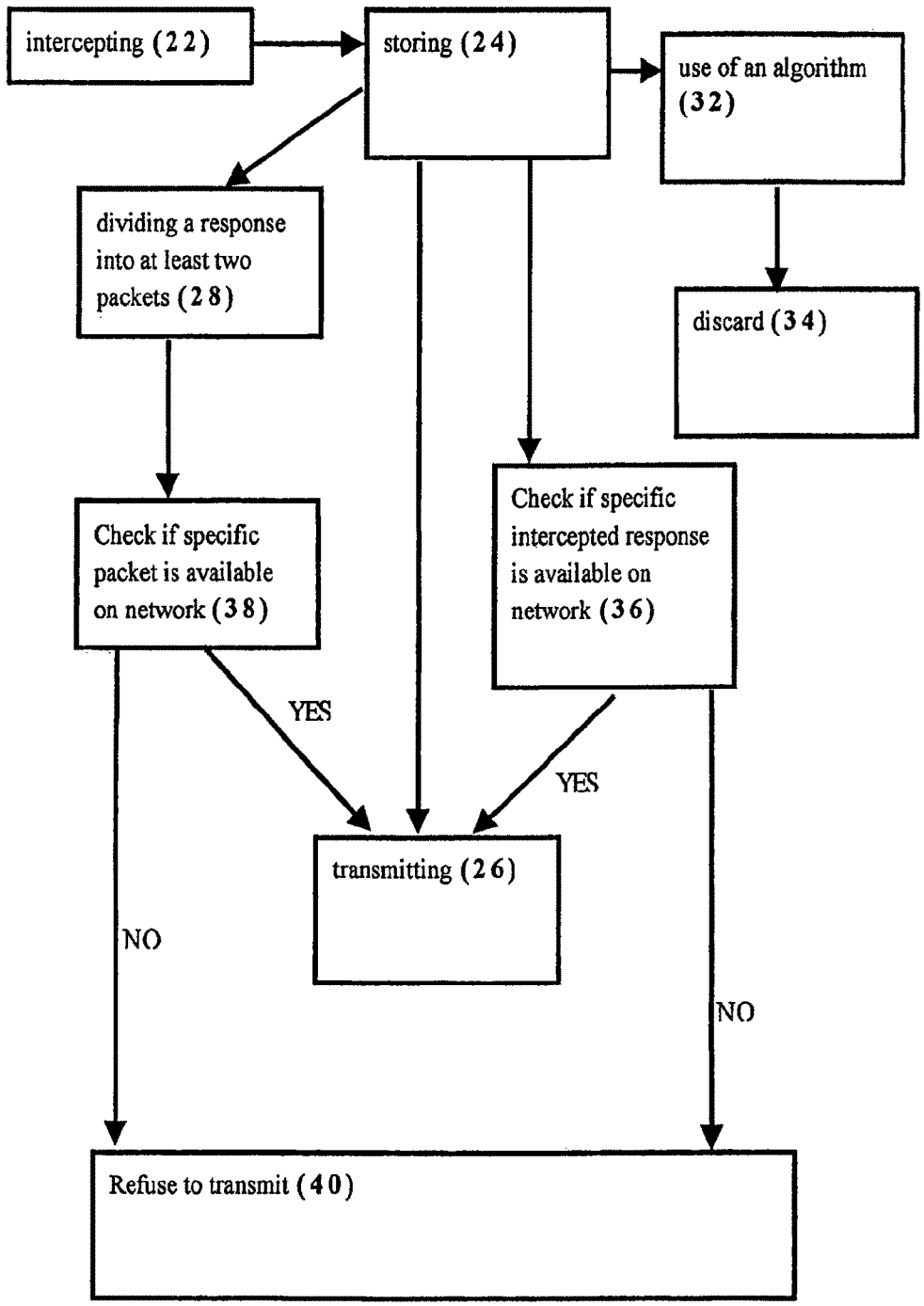

METHOD AND SYSTEM FOR ACCELERATING RECEIPT OF DATA IN A CLIENT TO CLIENT NETWORK

RELATED APPLICATIONS

The present application is a continuation of U.S. patent application Ser. No. 09/810,410 entitled "Method and System for Accelerating Receipt of Data in a Client to Client Network" filed on Mar. 19, 2001 to be issued as U.S. Pat. No. 7,203,741 on Apr. 10, 2007, which is a non-provisional application based on U.S. Patent Application No. 60/239,273 filed on Oct. 12, 2000. Both the 09/810,410 and 60/239,273 applications are hereby incorporated by reference.

FIELD AND BACKGROUND OF THE INVENTION

The present invention relates to a method and system for accelerating receipt of data in a client to client network and, more particularly, to use of an acceleration server in proximity to user clients within the network to store previously received data.

Since the advent of computers, the ability of these machines to communicate with one another has increased greatly. It is now common for large numbers of computers to be organized in networks. Typically local area networks (LANs) are further organized into wide area networks (WANs), the most striking example of which is the Internet.

The availability of Internet connectivity to a huge number of computers has created an unforeseen demand for data transfer among computer users. Often the available bandwidth along a portion of a data path is great, but the speed of data transfer is reduced by narrow bandwidth along a different portion of the path. Typically, bandwidth is less restricted as the data path becomes shorter.

Client to client networks (also referred to as peer to peer networks) have become popular in recent years (see for example www.napster.com). These networks provide members with software that allows them to transfer and receive data directly from other members across the Internet. Typically the transferred data is organized in large files which require significant amounts of time for transfer. The volume of transferred data in client to client networks is such that it can, in some cases, reduce available bandwidth within a network. This can cause undesirable slowdowns for other users.

There is thus a widely recognized need for, and it would be highly advantageous to have, a method and system for accelerating receipt of data in a client to client network devoid of the above limitation.

SUMMARY OF THE INVENTION

According to one aspect of the present invention there is provided a method of accelerating receipt of data in a client to client network wherein each client in the client to client network operates a software program for implementing queries and providing responses. The method includes the steps of (a) intercepting queries and responses in the client to client network; (b) storing the intercepted queries and responses in an acceleration server; and (c) transmitting the intercepted responses to clients submitting intercepted queries.

According to another aspect of the present invention there is provided a system for accelerating receipt of data in a client to client network wherein each client in the client to client network operates a software program for implementing queries and providing responses. The system includes at least one acceleration server designed and configured to: (a) intercept queries and responses in the client to client network wherein each of the queries and each of the responses contains unique identification information therein, the unique identification information facilitating interception thereof; (b) store the responses; and (c) transmit the responses to clients submitting intercepted queries. According to further features in preferred embodiments of the invention described below, step of intercepting is accomplished by a redirecting device.

According to still further features in the described preferred embodiments the redirecting device is a layer 4 switch.

According to still further features in the described preferred embodiments the acceleration server is located in a location selected from the group consisting of within a local area network and in a server belonging to an Internet Service Provider.

According to still further features in the described preferred embodiments the queries are requests for data and the responses are data.

According to still further features in the described preferred embodiments the data is in a format selected from the group of file types consisting of MP3, MPEG-2, MPEG-1, M-JPEG, MPEG-4, ActiveMovie/Video for Windows (.avi), QuickTime (.mov), RealVideo (.rm and .ram), H263.1, HTML, Flash, Gif, Tif, mpeguide and exe.

According to still further features in the described preferred embodiments wherein the software program includes at least two software programs.

According to still further features in the described preferred embodiments the step of storing is accomplished by use of an algorithm.

According to still further features in the described preferred embodiments the algorithm includes analysis of at least one variable selected from the group consisting of: (i) temporal information; (ii) ordinal information; (iii) frequency information (iv) client information; and (v) identification information.

According to still further features in the described preferred embodiments the temporal information includes at least one datum selected from the group consisting of time of initial storage, total residence time in storage, elapsed time since last retrieval from storage, average time between retrievals from storage and time of creation of an original file.

According to still further features in the described preferred embodiments the ordinal information includes at least one datum selected from the group consisting of order of receipt and order of retrieval.

According to still further features in the described preferred embodiments the frequency information includes at least one datum selected from the group consisting of frequency of retrieval and frequency of appearance in clients of the client to client network.

According to still further features in the described preferred embodiments the client information includes at least one datum selected from the group consisting of client connection status, client identification, and presence of a specific data on a specific client.

According to still further features in the described preferred embodiments the identification information includes at least one datum selected from the group consisting of file identification, client identification, and identification of content within a file.

According to still further features in the described preferred embodiments a single query and a single response are each individually intercepted by at least two acceleration servers.

According to still further features in the described preferred embodiments multiple acceleration server have a relative configuration selected from the group consisting of in series and in parallel.

According to still further features in the described preferred embodiments the acceleration server is located in a location selected from the group consisting of within a local area network, on a server belonging to an Internet service provider, at a cable television provider junction, at a satellite relay link, and within an ADSL junction. According to still further features in the described preferred embodiments the step of transmitting a specific intercepted response to a client submitting a specific intercepted query occurs only if a specific client which served as a source of the specific intercepted response is available on the client to client network and only if the specific client contains data identical to the specific intercepted response in a directory of the specific client.

According to still further features in the described preferred embodiments the sub-step of transmitting a specific packet of the at least two packets to a client submitting a specific intercepted query occurs only if a specific client which served as a source of the specific intercepted response is available on the client to client network and only if the specific client contains data identical to the specific intercepted response in a directory of the specific client.

According to still further features in the described preferred embodiments the step of transmitting an intercepted response to a client submitting a specific intercepted query occurs only if a specific client which contains data equivalent to the specific intercepted response in a directory of the specific client is available on the client to client network. According to still further features in the described preferred embodiments the sub-step of transmitting a specific packet of the at least two packets to a client submitting a specific intercepted query occurs only if a specific client which contains data equivalent to the specific intercepted response in a directory of the specific client is available on the client to client network.

According to still further features in the described preferred embodiments the acceleration server has a configuration selected from the group consisting of unidirectional and bi-directional.

According to still further features in the described preferred embodiments wherein the acceleration server further functions as a client in the client to client network.

According to still further features in the described preferred embodiments the step of transmitting the intercepted responses to clients submitting intercepted queries includes simultaneous transmission of portions of a single data set from at least two of the acceleration servers.

According to still further features in the described preferred embodiments the acceleration server acts as a transparent proxy server.

According to still further features in the described preferred embodiments the step of transmitting a specific response of the intercepted responses begins while the step of intercepting is still in progress for the specific response.

According to still further features in the described preferred embodiments the specific client which contains data equivalent to the specific intercepted response in a directory thereof includes at least two separate and distinct clients.

According to still further features in the described preferred embodiments the step of storing the intercepted responses in an acceleration server includes storing a single intercepted response which originates in at least two separate and distinct clients.

According to still further features in the described preferred embodiments the at least one acceleration server is further designed and configured for: (d) dividing a specific intercepted response of the intercepted responses into at least two packets and (e) transmitting the at least two packets to the clients submitting intercepted queries.

The present invention successfully addresses the shortcomings of the presently known configurations by providing a method and system for accelerating receipt of data in a client to client network which can be easily implemented using commercially available hardware.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a diagrammatic representation of components in a system according to the present invention; and FIG. 2 is a flow diagram of steps in a method according to the present invention.

DESCRIPTION OF THE PREFERRED EMBODIMENTS

The present invention is of a method and system for accelerating receipt of data in a client to client network which can be advantageously employed to reduce traffic within a wide are network and increase bandwidth availability.

Specifically, the present invention can be used to store frequently requested data on servers along a data path, thereby shortening the path for a subsequent retrieval of the same data.

The principles and operation of a method and system for accelerating receipt of data in a client to client network according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For purposes of this specification and the accompanying claims, the phrase "user client" generally refers to a computer and includes, but is not limited to, personal computers (PC) having an operating system such as DOS, Windows™, OS/2™ or Linux; Macintosh™, Palm OS™, EPOC™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system; personal digital assistants (PDA), cellular telephones having computer capabilities, a telephone having computer capabilities and Web TVs, each of which is known to include an inherent or connectable display device. A user client is characterized as having at least one input device and at least one output device.

For purposes of this specification and the accompanying claims, the term "server" refers to any computing machine capable of exchanging data with at least one other computing machine. A single server may comprise an individual computing machine or a plurality of such machines acting in concert to perform a function requested by at least one other computing machine.

For purposes of this specification and the accompanying claims, the term "Windows™" includes but is not limited to Windows 95™, Windows 2000™ Windows 3.x™ in which "x" is an integer such as "1", Windows NT™, Windows 98™, Windows CE™ Windows Millennium™ and any upgraded versions of these operating systems by Microsoft Corp (USA) and/or window managers for the graphical X Windows system for UNIX based operating systems and/or its variants such as Linux.

For purposes of this specification and the accompanying claims, the phrase "computing platform" refers to any particular operating system and/or hardware device, as previously described, according to which the format for data communication and/or presentation (display) thereof is determined.

For purposes of this specification and the accompanying claims, the term "data" refers to digital data including, but not limited to a software program, a text file, a sound file, a file containing at least one video image, and an animation sequence as well as to any combinations thereof.

For purposes of this specification and the accompanying claims, the phrase "channel of communication" includes, but is not limited to a telephone connection, a cellular telephone connection, an Internet connection, an infrared frequency transmission connection, a local area network connection, a radio frequency connection, a fiber-optic connection or a connection by a wire. Inherent in the idea of a communication channel is an open status during which data transmission may occur. In some cases, communication channels may also have a closed status during which no data transmission may occur. The phrase is to be construed in its broadest possible sense so that it encompasses any mode of data transfer.

For purposes of this specification and the accompanying claims the phrase "software program" refers to any algorithm for performing at least one function on a computing device. The term specifically includes, but is not limited to web browsers, music players, animation players, video players, games, compression algorithms, search programs, client to client interfaces and viewers.

For purposes of this specification and the accompanying claims the phrase "display device" refers to any device for presentation of data to a user. The definition includes, but is not limited to speakers, earphones, LCD screens, LED displays, CRT displays and active matrix displays.

For purposes of this specification and the accompanying claims the phrase "input device" refers to any device for entry of data to a computing device. The definition includes, but is not limited to a keyboard, a computer mouse, a trackpad, a track ball, a stylus, a touchscreen, a camera and a microphone.

Referring now to the drawings, FIG. 2 illustrates a method 20 of accelerating receipt of data in a client to client network. According to the present invention, data is typically received in response to a query. Each client 57 (FIG. 1) in the client to client network operates a software program for implementing queries and providing responses. The software program may include, in some cases, at least two software programs. Typically the queries are requests for data and the responses are data. The data may be, for example, organized in a file type such as MP3, DVD, MPEG-2, MPEG-1, M-JPEG, MPEG-4, ActiveMovie/Video for Windows (.avi), QuickTime (.mov), RealVideo (.rm and .ram), H263.1, HTML, Flash, Gif, Tif, mpeguide, exe or any other file type.

Method 20 includes the step of intercepting 22 queries and responses in the client to client network. According some embodiments of the invention, the step of intercepting is accomplished by a redirecting device which may include, for example, a layer 4 switch.

Method 20 further includes the step of storing 24 the intercepted queries and responses in an acceleration server 52.

Acceleration server 52 may be located, for example, within a local area network 54 (e.g. 57g and 57k) or in a server 60 belonging to an Internet Service Provider. In some cases, step of storing 24 is accomplished by use of an algorithm which may include analysis of, for example, temporal information, ordinal information, frequency information, client information, identification information or combinations thereof. "Temporal information" as used herein may include, but is not limited to, data such as time of initial storage, total residence time in storage, elapsed time since last retrieval from storage, average time between retrievals from storage and time of creation of an original file. "Time" as used herein may include any reference to an absolute or relative measure of time including, but not limited to an absolute or elapsed time (e.g. 16:43:21 or 3 hrs 21 minutes and 04 seconds since receipt) or an absolute or relative date (e.g. Feb. 22, 2001 or yesterday). "Ordinal information" as used herein refers to, for example, data such as order of receipt and order of retrieval. "Frequency information" as used herein refers to, for example, data such as frequency of retrieval and frequency of appearance in clients of the client to client network. "Client information" as used herein refers to, for example, data such as client connection status, client identification, and presence of specific data (i.e. a file or portion thereof) on a specific client. "Identification information" as used herein refers to, for example, data such as file identification, client identification, and identification of content within a file.

Method 20 further includes the step of transmitting 26 the intercepted responses to clients 57 submitting intercepted queries.

In some cases a single query or a single response may be intercepted by at least two acceleration servers. For example, a query for a video game called "piggy picnic" originates at client 57h in LAN 54a. The query is first intercepted by acceleration server 52 of client 57g. Because networks may reside one within another, although 57g is a client with respect to the client to client network, it (57g) includes server function within LAN 54a. In this case acceleration server 52 of client 57g is not storing a copy of "piggy picnic" from a previous response, so the query is then relayed via ISP server 60 where the query is screened against stored responses in acceleration server 52 of server 60. Again, no match is found. The query is next relayed to user clients 57a, b, and c and to Internet 56. From Internet 56, the query is relayed to LAN 54b where it encounters acceleration server 52 of client 57k, and to Cable TV junction 62/Satellite relay 64 which contain an additional acceleration server 52. By these means, the query eventually reaches all of clients 57. At this point the query has been intercepted, and according to some embodiments stored, in a total of four acceleration servers 52. The result of the query is that copies of piggy picnic are present on clients 57*a* and 57*m*. This information is relayed to requesting client 57*h* via the same channels of communication described hereinabove. At this point client 57*h* requests to receive a copy of piggy picnic from client 57*a*. As this request is fulfilled, copies of piggy picnic may be stored on acceleration servers 52 of servers 60 and 57*g*. As a result, a subsequent request from client 57*c* for piggy picnic may be answered by transmitting the game directly from acceleration server 52 of server 60. Alternately or additionally a subsequent request from client 57*f* for piggy picnic may be answered by transmitting the game from acceleration server 52 of server 60 via Internet 56 and acceleration server 52 of satellite relay 64 to requesting client 57*f*. In this case, an additional copy of the game is generated at acceleration server 52 of satellite relay 64. In general, practice of method 20 causes copies of frequently requested data to accumulate in areas where the requests originate.

According to additional embodiments of the invention, the step of transmitting 26 a specific intercepted response to a client submitting a specific intercepted query occurs only if a specific client which served as a source of the specific intercepted response is available on the client to client network and only if the specific client contains data identical to the specific intercepted response in a directory of the specific client. According to these embodiments, acceleration server 52 checks 36 if a specific intercepted response is available. If it is available, transmission occurs 26. If it is not available, no transmission occurs 40.

In some cases, requested data may be divided 28 into at least two packets before transmission. According to additional embodiments of the invention, the sub-step of transmitting a specific packet of the at least two packets to a client submitting a specific intercepted query occurs only if a specific client which served as a source of the specific intercepted response is available on the client to client network and only if the specific client contains data identical to the specific intercepted response in a directory of the specific client. That is, prior to transmitting a packet the network is checked 38 for the presence of that packet. If the packet is available, transmission occurs 26. If it is not available, no transmission occurs 40.

Alternately or additionally, the step of transmitting 26 an intercepted response to a client submitting a specific intercepted query occurs only if a specific client which contains data equivalent to the specific intercepted response in a directory of the specific client is available on the client to client network. If the equivalent data is available, transmission occurs 26. If it is not available, no transmission occurs 40. The same principle may be applied to packets. If an equivalent packet is available, transmission occurs 26. If it is not available, no transmission occurs 40.

In some cases, the step of storing 24 the intercepted responses in an acceleration server may include storing 24 a single intercepted response which originates in at least two separate and distinct clients. For example, client 57*a* requests an accapella rendition of "Hatikva" by the Ramallah boys' choir as an MP3 file. The requested file is found on both clients 57*b* and 57*c*. The file is divided into ten packets, with packets 1, 3, 5, 7 and 9 being sent to acceleration server 52 of server 60 by client 57*b*, and packets 2, 4, 6, 8 and 10 being sent to acceleration server 52 of server 60 by client 57*c*.

Alternately or additionally, the step of transmitting 26 the intercepted responses to clients 57 submitting intercepted queries may include simultaneous transmission of portions of a single data set from at least two of the acceleration servers. For example, if client 57*n* requests an MP3 file of Suzy Cream Cheese, and the file is found on acceleration servers 52 of servers 60 and Satellite relay 64, packets having their origins in each of the two copies may be concurrently transmitted to client 57*n* in order to provide a single copy of this much loved ditty.

In some cases, the step of transmitting a specific response of the intercepted responses may begin while the step of intercepting is still in progress for the specific response.

According to another aspect of the present invention there is provided a system 50 for accelerating receipt of data in a client to client network wherein each client in the client to client network operates a software program for implementing queries and providing responses. The system includes at least one acceleration server 52 designed and configured to intercept queries and responses in the client to client network wherein each of the queries and each of the responses contains unique identification information therein, the unique identification information facilitating interception thereof. Acceleration server 52 is further designed and configured to store the responses. Acceleration server 52 is further designed and configured to transmit the responses to clients submitting intercepted queries. Limits may be placed on this transmission a described hereinabove and hereinbelow.

System 50 may contain multiple acceleration servers 52 which may have a relative configuration which is either in series or in parallel or a combination thereof. For example, in fulfilling a request originating at client 57*m*, acceleration server 52 of server 57*k* and acceleration server 52 of satellite relay 64 are in series with respect to one another. Similarly, acceleration server 52 of satellite relay 64 and acceleration server 52 of ISP server 60 are in parallel with one another with respect to the same request.

Within system 50, acceleration server 52 may be located in a variety of locations including, but not limited to, within local area network (54*a* and 54*b*), on a server 60 belonging to an Internet service provider, at a cable television provider junction 62, at a satellite relay link 64, and within an ADSL junction.

Similarly, acceleration server 52 may be configured to be either unidirectional or bi-directional. This means that, for example, acceleration server 52 of server 57*k* may be configured to transmit stored responses only to members of LAN 54*b*, in which case it is said to be a unidirectional acceleration server 52. Alternately acceleration server 52 of server 57*k* may be configured to transmit stored responses in response to queries from inside LAN 54*b* and from clients 57 outside LAN 54*b* in which case it is said to be a bi-directional acceleration server 52.

In some cases acceleration server 52 may further function as a client 57 in the client to client network. Alternately or additionally, acceleration server 52 may act as a transparent proxy server.

In some cases the specific client 57 which contains data equivalent to the specific intercepted response in a directory thereof includes at least two separate and distinct clients. This may be the case when, for example, a file is divided into packets as described hereinabove.

According to some embodiments of system 50, acceleration server 52 is further designed and configured for dividing a specific intercepted response of the intercepted responses into at least two packets and transmitting the at least two packets to the clients submitting intercepted queries.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of transmitting data to a client in a peer-to-peer network, the peer-to-peer network including a plurality of clients, each of which being capable of initiating queries to at least two other clients in the peer-to-peer network, the queries identifying a desired data item and being sent to at least two other clients to each provide a different portion of the data item, each of the clients also being capable of responding to queries from other clients, the method comprising:
   (a) identifying queries initiated by the first client to at least two other clients in the peer-to-peer network to have the at least two other clients each provide a different portion of a data item identified by the queries;
   (b) determining whether any of the different portions of the data item that is identified by the queries initiated by the first client are stored at one or more acceleration servers;
   (c) when any one of the different portions of the data item that is identified by the queries initiated by the first client is stored at the one or more acceleration servers, transmitting that portion of the data item stored at the one or more acceleration servers to the first client such that the first client receives that portion of the data item from the one or more acceleration servers instead of from the at least two other clients in the peer-to-peer network; and
   (d) when any one of the different portions of the data item that is identified by the queries initiated by the first client is not stored at the one or more acceleration servers, receiving that portion of the data item from one or more clients in the peer-to-peer network and storing the portions of the data item at the one or more acceleration servers such that a subsequent request by a client for that portion of the data item can be satisfied by the one or more acceleration servers.

2. The method of claim 1, wherein steps (a) through (d) are performed transparently to the first client and the at least two other clients in the peer-to-peer network.

3. The method of claim 1, wherein said one or more acceleration servers further function as one or more clients in the peer-to-peer network.

4. The method of claim 1, wherein step (a) comprises redirecting the queries.

5. The method of claim 4, wherein redirecting the queries is performed using a layer 4 switch.

6. The method of claim 1, wherein step (a) comprises redirecting the queries and responses to said queries.

7. The method of claim 1, wherein step (a) comprises monitoring communications from the first client.

8. The method of claim 1, wherein step (a) comprises receiving the queries at the one or more acceleration servers.

9. The method of claim 1, wherein step (a) comprises intercepting communications from the first client.

10. The method of claim 1, wherein the one or more acceleration servers are located in a local area network, in a server at a cable television provider junction, at a satellite relay link, or within an ADSL junction.

11. The method of claim 1, wherein the data item is in a format selected from the group consisting of MP3, DVid, MPEG-2, MPEG-1, M-JPEG, MPEG-4, ActiveMovie/Video for Windows (.avi), QuickTime (.mov), RealVideo (.rm and .ram), H263.1, HTML, Flash, GIF, TIFF, mpeguide, and exe.

12. The method of claim 1, wherein step (b) further comprises analyzing portions of identified data items based on at least one variable, and storing the portions of identified data items based on the at least one variable.

13. The method of claim 12, wherein the variable is selected from the group consisting of temporal information, ordinal information, frequency information, client information, and identification information.

14. The method of claim 13, wherein said temporal information includes at least one datum selected from the group consisting of time of initial storage, total residence time in storage, elapsed time since last retrieval from storage, average time between retrievals from storage, and time of creation of an original data item.

15. The method of claim 13, wherein said ordinal information includes at least one datum selected from the group consisting of order of receipt and order of retrieval.

16. The method of claim 13, wherein said frequency information includes at least one datum selected from the group consisting of frequency of retrieval and frequency of appearance in clients of said peer-to-peer network.

17. The method of claim 13, wherein said client information includes at least one datum selected from the group consisting of client connection status, client identification, and presence of a specific data on a specific client.

18. The method of claim 13, wherein said identification information includes at least one datum selected from the group consisting of file identification, client identification, and identification of content within a data item.

19. The method of claim 1, wherein each of the one or more acceleration servers has a unidirectional or bidirectional transmission policy, and wherein the method further comprising, prior to step (c), analyzing the transmission policy of the one or more acceleration servers.

20. The method of claim 1, wherein each of the one or more acceleration servers is associated with a given network and responds to queries from clients outside of said given network.

21. The method of claim 1, further comprising, prior to step (c), determining whether a particular client that served as a source of a portion of the data item stored at the one or more acceleration servers is available on the peer-to-peer network.

22. The method of claim 1, wherein when any one of the different portions of the data item that is identified by the queries initiated by the first client is stored at the one or more acceleration servers, transmitting that portion of the data item stored at the one or more acceleration servers to the first client only when a client having that portion of the data item is available on the peer-to-peer network.

23. The method of claim 1, wherein when any one of the different portions of the data item that is identified by the queries initiated by the first client is stored at the one or more acceleration servers, transmitting that portion of the data item stored at the one or more acceleration servers to the first client only when a particular client to whom a query from the first client is directed is available on the peer-to-peer network.

24. The method of claim 1, wherein said step of transmitting the portions of the data item stored at the one or more acceleration servers begins while storing the portions of the data item for the queries.

25. The method of claim 1, wherein the queries and responses to the queries each include unique identification information for data items or portions thereof.

26. The method of claim 1, wherein the one or more acceleration servers comprise a plurality of acceleration servers, at least some of which are arranged in a series configuration.

27. The method of claim 1, wherein the one or more acceleration servers comprise a plurality of acceleration servers, at least some of which are arranged in a parallel configuration.

28. The method of claim 1, wherein the one or more acceleration servers comprise a plurality of acceleration servers, at least some of which are arranged in a series configuration and at least some of which are arranged in a parallel configuration.

29. The method of claim 1, wherein the one or more acceleration servers comprise a plurality of acceleration servers, and the plurality of acceleration servers cooperate in transmitting portions of the data item to the first client in step (c).

30. The method of claim 1, wherein the one or more acceleration servers comprise a plurality of acceleration servers, and wherein at least one portion of the data item is transmitted from one acceleration server to another before being transmitted to the first client in step (c).

31. The method of claim 1, wherein the one or more acceleration servers comprise a plurality of acceleration servers, and wherein step (d) comprises receiving the portions of the data item from one or more clients in the peer-to-peer network and storing the portions of the data item at the plurality of acceleration servers such that a subsequent request by a client for the portions of the data item can be satisfied by one or more of the plurality of acceleration servers.

32. The method of claim 1, wherein the one or more acceleration servers comprise a plurality of acceleration servers that cooperate to store data items such that frequently requested data items are stored at acceleration servers that are physically closer to clients that originate requests for the frequently requested data items.

33. The method of claim 1, wherein the one or more acceleration servers each stores different portions of the data item each received from at least two clients.

34. The method of claim 1, wherein the one or more acceleration servers comprise a plurality of acceleration servers, each providing a different portion of the data item identified by the queries to the first client.

35. A system for transmitting data to a client in a peer-to-peer network, the peer-to-peer network including a plurality of clients, each of which being capable of initiating queries to at least two other clients in the peer-to-peer network, the queries identifying a desired data item and being sent to at least two other clients to each provide a different portion of the data item, each of the clients also being capable of responding to queries from other clients, the system comprising one or more servers operatively connected to the peer-to-peer network, each of said one or more servers comprising:

a mechanism for identifying a queries initiated by the first client to at least two other clients in the peer-to-peer network to have the at least two other clients each provide a different portion of a data item identified by the queries;

a mechanism for determining whether any one of the different portions of the data item that is identified by the queries initiated by the first client are stored at one or more servers;

a mechanism for transmitting one or more different portions of the data item stored at the one or more servers to the first client when any portions of the data item that is identified by the queries initiated by the first client are stored at the one or more servers such that the first client receives the portions of the data item from the one or more servers instead of from the at least two other clients in the peer-to-peer network; and a mechanism for receiving the portions of the data item from one or more clients in the peer-to-peer network and storing the portions of the data item at the one or more servers when any portions of the data item that is identified by the queries initiated by the first client are not stored at the one or more servers such that a subsequent request by a client for the portions of the data item can be satisfied by the one or more servers.

36. The system of claim 35, wherein the one or more servers are configured to operate transparently to the first client and the at least two other clients in the peer-to-peer network.

37. The system of claim 35, wherein said one or more servers further function as one or more clients in the peer-to-peer network.

38. The system of claim 35, wherein the mechanism for identifying queries comprises a redirector for redirecting the queries.

39. The system of claim 38, wherein the redirector comprises a layer 4 switch.

40. The system of claim 35, wherein the mechanism for identifying queries redirects the queries and responses to said queries.

41. The system of claim 35, wherein the mechanism for identifying queries monitors communications from the first client.

42. The system of claim 35, wherein the mechanism for identifying queries receives the queries at the one or more servers.

43. The system of claim 35, wherein the mechanism for identifying queries intercepts communications from the first client.

44. The system of claim 35, wherein the one or more servers are located in a local area network, in a server at a cable television provider junction, at a satellite relay link, or within an ADSL junction.

45. The system of claim 35, wherein the data item is in a format selected from the group consisting of MP3, DVid, MPEG-2, MPEG-1, M-JPEG, MPEG-4, ActiveMovie/Video for Windows (.avi), QuickTime (.mov), RealVideo (.rm and .ram), H263.1, HTML, Flash, GIF, TIFF, mpeguide, and exe.

46. The system of claim 35, wherein the mechanism for identifying queries further analyzes portions of identified data items based on at least one variable, and stores the portions of identified data items based on the at least one variable.

47. The system of claim 46, wherein the variable is selected from the group consisting of temporal information, ordinal information, frequency information, client information, and identification information.

48. The system of claim 47, wherein said temporal information includes at least one datum selected from the group consisting of time of initial storage, total residence time in storage, elapsed time since last retrieval from storage, average time between retrievals from storage, and time of creation of an original data item.

49. The system of claim 47, wherein said ordinal information includes at least one datum selected from the group consisting of order of receipt and order of retrieval.

50. The system of claim 47, wherein said frequency information includes at least one datum selected from the group consisting of frequency of retrieval and frequency of appearance in clients of said peer-to-peer network.

51. The system of claim 47, wherein said client information includes at least one datum selected from the group consisting of client connection status, client identification, and presence of a specific data on a specific client.

52. The system of claim 47, wherein said identification information includes at least one datum selected from the group consisting of file identification, client identification, and identification of content within a data item.

53. The system of claim 35, wherein each of the one or more servers has a unidirectional or bidirectional transmission policy, and is configured to analyze the transmission policy of the one or more servers.

54. The system of claim 35, wherein each of the one or more servers is associated with a given network and responds to queries from clients outside of said given network.

55. The system of claim 35, wherein the one or more servers are configured to determine whether a particular client that served as a source of a portion of the data item stored at the one or more servers is available on the peer-to-peer network.

56. The system of claim 35, wherein the one or more servers are configured to determine whether a client having a portion of the data item stored at the one or more servers is available on the peer-to-peer network.

57. The system of claim 35, wherein the one or more servers are configured to determine whether a particular client to whom the queries from the first client is directed is available on the peer-to-peer network.

58. The system of claim 35, wherein each of the one or more servers are configured to transmit the portions of the data item stored at the one or more servers while storing the portions of the data item for the queries.

59. The system of claim 35, wherein the queries and responses to the queries each include unique identification information for data items or portions thereof.

60. The system of claim 35, wherein the one or more servers comprise a plurality of servers, at least some of which are arranged in a series configuration.

61. The system of claim 35, wherein the one or more servers comprise a plurality of servers, at least some of which are arranged in a parallel configuration.

62. The system of claim 35, wherein the one or more servers comprise a plurality of servers, at least some of which are arranged in a series configuration and at least some of which are arranged in a parallel configuration.

63. The system of claim 35, wherein the one or more servers comprise a plurality of servers, and the plurality of servers cooperate in transmitting portions of the data item to the first client.

64. The system of claim 35, wherein the one or more servers comprise a plurality of servers, and wherein at least one portion of the data item is transmitted from one server to another before being transmitted to the first client.

65. The system of claim 35, wherein the one or more servers comprise a plurality of servers, and wherein the portions of the data item received from the one or more clients in the peer-to-peer network are stored at the plurality of servers such that a subsequent request by a client for the portions of the data item can be satisfied by one or more of the plurality of servers.

66. The system of claim 35, wherein the one or more servers comprise a plurality of servers that cooperate to store data items such that frequently requested data items are stored at servers that are physically closer to clients that originate requests for the frequently requested data items.

67. The system of claim 35, wherein the one or more servers each stores different portions of the data item each received from at least two clients.

68. The system of claim 35, wherein the one or more servers comprise a plurality of servers, each providing a different portion of the data item identified by the queries to the first client.

69. One or more computers for controlling data transmission to a client in a peer-to-peer network, the peer-to-peer network including a plurality of clients, each of which being capable of initiating queries to at least two other clients in the peer-to-peer network, the queries identifying a desired data item and being sent to at least two other clients to each provide a different portion of the data item, each of the clients also being capable of responding to queries from other clients, the one or more computers being configured to:
 (a) identify queries initiated by the first client to at least two other clients in the peer-to-peer network to have the at least two other clients each provide a different portion of a data item identified by the queries;
 (b) determine whether any of the different portions of the data item that is identified by the queries initiated by the first client are stored at the one or more computers;
 (c) when any one of the different portions of the data item that is identified by the queries initiated by the first client is stored at the one or more computers, transmit that portion of the data item stored at the one or more computers to the first client such that the first client receives that portion of the data item from the one or more computers instead of from the at least two other clients in the peer-to-peer network; and
 (d) when any one of the different portions of the data item that is identified by the queries initiated by the first client is not stored at the one or more computers, receive that portion of the data item from one or more clients in the peer-to-peer network and store the portions of the data item at the one or more computers such that a subsequent request by a client that portion of the data item can be satisfied by the one or more computers.

70. The one or more computers of claim 67, wherein (a) through (d) are performed transparently to the first client and the at least two other clients in the peer-to-peer network.

71. The one or more computers of claim 69, wherein (a) comprises redirecting the queries.

72. The one or more computers of claim 69, wherein redirecting the queries is performed using a layer 4 switch.

73. The one or more computers of claim 69, wherein (a) comprises redirecting the queries and responses to said queries.

74. The one or more computers of claim 69, wherein (a) comprises monitoring communications from the first client.

75. The one or more computers of claim 69, wherein (a) comprises receiving the queries at the one or more computers.

76. The one or more computers of claim 69, wherein (a) comprises intercepting communications from the first client.

77. The one or more computers of claim 69, wherein the one or more computers are located in a local area network, in a server at a cable television provider junction, at a satellite relay link, or within an ADSL junction.

78. The one or more computers of claim 69, wherein the data item is in a format selected from the group consisting of MP3, DVid, MPEG-2, MPEG-1, M-JPEG, MPEG-4, Active-Movie/Video for Windows (.avi), QuickTime (.mov), RealVideo (.rm and .ram), H263.1, HTML, Flash, GIF, TIFF, mpeguide, and exe.

79. The one or more computers of claim 69, wherein (b) further comprises analyzing portions of identified data items based on at least one variable, and storing the portions of identified data items based on the at least one variable.

80. The one or more computers of claim 79, wherein the variable is selected from the group consisting of temporal information, ordinal information, frequency information, client information, and identification information.

81. The one or more computers of claim 80, wherein said temporal information includes at least one datum selected from the group consisting of time of initial storage, total residence time in storage, elapsed time since last retrieval from storage, average time between retrievals from storage, and time of creation of an original data item.

82. The one or more computers of claim 80, wherein said ordinal information includes at least one datum selected from the group consisting of order of receipt and order of retrieval.

83. The one or more computers of claim 80, wherein said frequency information includes at least one datum selected from the group consisting of frequency of retrieval and frequency of appearance in clients of said peer-to-peer network.

84. The one or more computers of claim 80, wherein said client information includes at least one datum selected from the group consisting of client connection status, client identification, and presence of a specific data on a specific client.

85. The one or more computers of claim 80, wherein said identification information includes at least one datum selected from the group consisting of file identification, client identification, and identification of content within a data item.

86. The one or more computers of claim 69, wherein each of the one or more computers has a unidirectional or bidirectional transmission policy, and further comprising instructions that cause the processor to analyze the transmission policy of the one or more computers.

87. The one or more computers of claim 69, wherein each of the one or more computers is associated with a given network and responds to queries from clients outside of said given network.

88. The one or more computers of claim 69, wherein the one or more computers are further configured to determine whether a particular client that served as a source of a portion of the data item stored at the one or more computers is available on the peer-to-peer network.

89. The one or more computers of claim 69, wherein the one or more computers are further configured to transmit the portion of the data item stored at the one or more computers to the first client only when a client having a that portion of the data item is available on the peer-to-peer network.

90. The one or more computers of claim 69, wherein the one or more computers are further configured to transmit the portion of the data item stored at the one or more computers to the first client only when a particular client to whom the query from the first client is directed is available on the peer-to-peer network.

91. The one or more computers of claim 69, wherein the one or more computers are further configured to transmit the portions of the data item stored at the one or more computers while storing the portions of the data item for the queries.

92. The one or more computers of claim 69, wherein the queries and responses to the queries each include unique identification information for data items or portions thereof.

93. The one or more computers of claim 69, wherein the one or more computers comprise a plurality of servers, at least some of which are arranged in a series configuration.

94. The one or more computers of claim 69, wherein the one or more computers comprise a plurality of acceleration servers, at least some of which are arranged in a parallel configuration.

95. The one or more computers of claim 69, wherein the one or more computers comprise a plurality of servers, at least some of which are arranged in a series configuration and at least some of which are arranged in a parallel configuration.

96. The one or more computers of claim 69, wherein the one or more computers comprise a plurality of servers, and the plurality of servers cooperate in transmitting portions of the data item to the first client in step (c).

97. The one or more computers of claim 69, wherein the one or more computers comprise a plurality of servers, and wherein at least one portion of the data item is transmitted from one server to another before being transmitted to the first client in step (c).

98. The one or more computers of claim 69, wherein the one or more computers comprise a plurality of servers, and wherein step (d) comprises receiving the portions of the data item from one or more clients in the peer-to-peer network and storing the portions of the data item at the plurality of servers such that a subsequent request by a client for the portions of the data item can be satisfied by one or more of the plurality of servers.

99. The one or more computers of 67, wherein the one or more computers comprise a plurality of servers that cooperate to store data items such that frequently requested data items are stored at servers that are physically closer to clients that originate requests for the frequently requested data items.

100. The one or more computers of claim 69, wherein the one or more computers each stores different portions of the data item each received from at least two clients.

101. The one or more computers of claim 69, wherein the one or more computers comprise a plurality of servers, each providing a different portion of the data item identified by the query to the first client.

* * * * *